United States Patent [19]

Miyazaki et al.

[11] Patent Number: 5,392,083
[45] Date of Patent: Feb. 21, 1995

[54] DISPLAY DEVICE IN VIEW-FINDER

[75] Inventors: Takemi Miyazaki; Koyoaki Hazama; Kazuhiro Nakanishi; Kohei Ota, all of Hachioji, Japan

[73] Assignee: Konica corporation, Japan

[21] Appl. No.: 170,149

[22] Filed: Dec. 20, 1993

[30] Foreign Application Priority Data

Jan. 25, 1993 [JP] Japan .................... 5-005104

[51] Int. Cl.6 .................................... G03B 13/02
[52] U.S. Cl. ........................ 354/219; 354/289.1
[58] Field of Search ............... 354/219, 220–225, 354/289.1; 359/438, 831, 833, 834, 835, 836, 837

[56] References Cited

U.S. PATENT DOCUMENTS 5,245,375  9/1993  Ohshita ...................... 354/219

FOREIGN PATENT DOCUMENTS 63-183430  7/1988  Japan ...................... 354/219

Primary Examiner—Howard B. Blankenship
Attorney, Agent, or Firm—Jordan B. Bierman

[57] ABSTRACT

A display device in a real image type viewfinder includes an optical member having an image formation surface thereon, which is provided between an objective lens and an eyepiece. An object image is formed by the objective lens on the image formation surface. A display section in a view field frame to display the view field frame is provided when an inclined surface portion is formed in a direction in which a peripheral portion of the image formation surface of the optical member is protruded with respect to the image formation surface.

4 Claims, 7 Drawing Sheets

DISPLAY DEVICE IN VIEW-FINDER

BACKGROUND OF THE INVENTION

The present invention relates to a display device in a real image type viewfinder, and specifically to the display device in a viewfinder in which both an image of an object and a frame in a field of view can be observed.

Conventionally, various types of viewfinder systems have been proposed for a photographic camera and a video camera which have a photographic optical system and a viewfinder optical system. For example, as a simple viewfinder system, many viewfinder systems have been proposed, in which a lighting type viewfinder, an Albada type viewfinder, or the like is used. For example, in the lighting type viewfinder in these viewfinder systems, when a frame in a field of view has been displayed, the viewfinder has been composed of a frame made of other frame members through a half mirror.

Further, in the Albada type viewfinder, the viewfinder has been composed when the frame in a field of view, (hereinafter, called a view field frame), has been vaporized onto an eyepiece side member. Further, in the viewfinder system of a real image type, the viewfinder system has been composed as follows: a frame, made of other members, has been arranged near the position at which an image of the object has been formed using an objective lens, even when there is a display in the viewfinder.

In these cases, because a frame, for displaying the view field frame, and a space, in which the frame is supported, are necessary, the number of parts is increased, the display device becomes more complex, manufacturing processes become more complicated, and the manufacturing cost is increased. Further, because the view field frame is separate from the optical member, the position of the frame is shifted with respect to the image.

Further, as disclosed in Japanese Patent Publication Open to Public Inspection 183430/1988, the following has been proposed: the view field frame is displayed in the viewfinder using the shape of the prism on which processing has been conducted directly. Because the view field frame is formed when a V-shaped slot is cut in a Porro prism, it is difficult to precisely produce the end portion of the view field frame, and the processing cost is increased, so that the view field frame is not practical.

SUMMARY OF THE INVENTION

A first object of the present invention is to provide a practical display device in a viewfinder, in which the view field frame is integrally provided with the optical member and can be easily formed. A second object of the present invention is to provide a display device in a viewfinder in which a part of the optical member can also be used for a display in a viewfinder.

The first embodiment of the display device in the viewfinder is described as follows: an optical member, on which an image formation surface is formed, is located between an objective lens and an eyepiece in the display device in the real image type viewfinder, wherein an object image is formed on the image formation surface using the objective lens; and a display section in a view field frame to display the view field frame is provided when an inclined surface portion is formed in the direction in which a peripheral portion of the image formation surface of the optical member is protruded with respect to the image formation surface.

The second embodiment of the present invention is characterized in that: an inclination angle of the inclined surface portion of the optical member is not less than 10° and is smaller than 90°.

The third embodiment of the present invention is characterized in that: a photoelectric display unit is provided on the side of the optical member in the inclined surface portion of the optical member; and display is conducted in the viewfinder when the display unit is controlled.

In the first embodiment, the optical member can be easily processed when the inclined surface portion is formed in the direction in which the peripheral portion of the optical member is protruded with respect to the image formation surface, on the peripheral portion of the image formation surface of the optical member, by which the image formation surface of the object image is formed in the real image type viewfinder, and the view field frame is displayed.

In the second embodiment, the inclined surface portion can be clearly observed as a view field frame when the inclination angle of the inclined surface portion of the optical member is not less than 10° and smaller than 90°.

In the third embodiment, photographic information is displayed in the viewfinder when the light for display, which is sent from the photoelectric display unit provided at the periphery of the inclined surface portion by which the view field frame of the optical member is formed, is refracted using the inclined surface portion.

DETAILED DESCRIPTION OF THE PREFERRED EMBODIMENT

Figure 1:
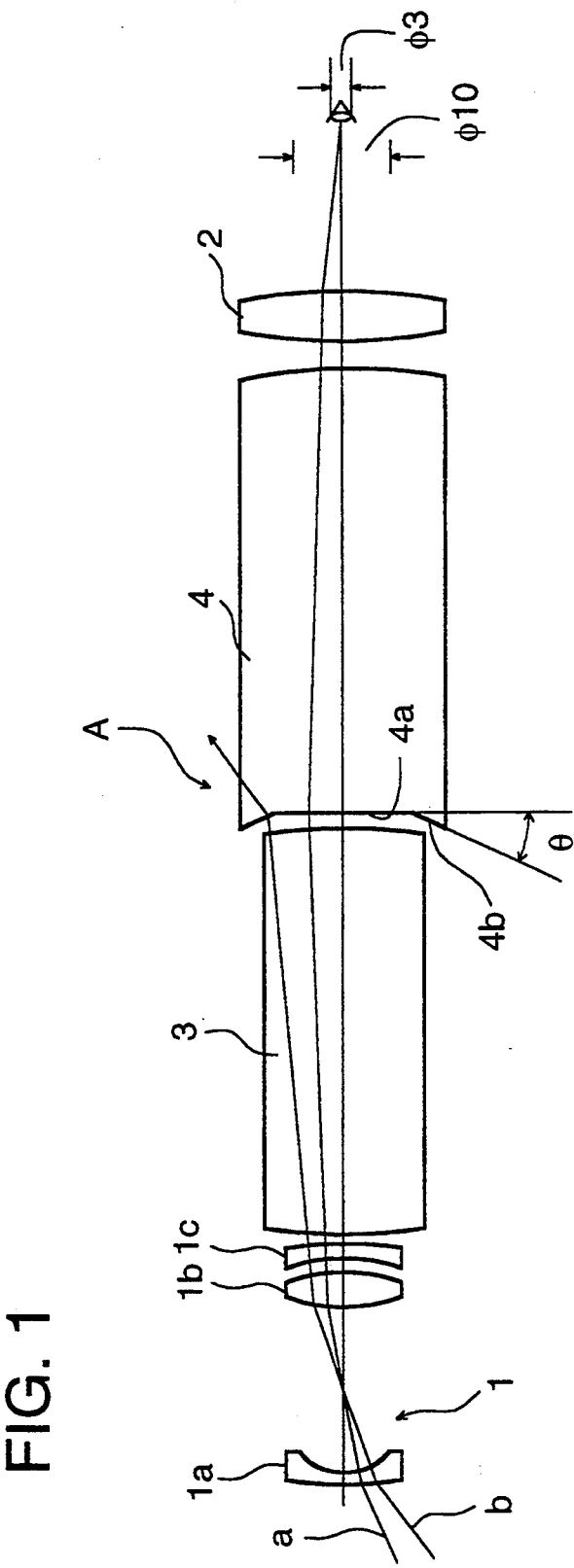
FIG. 1 is a schematic drawing showing a display unit in a viewfinder.
Figure 2:
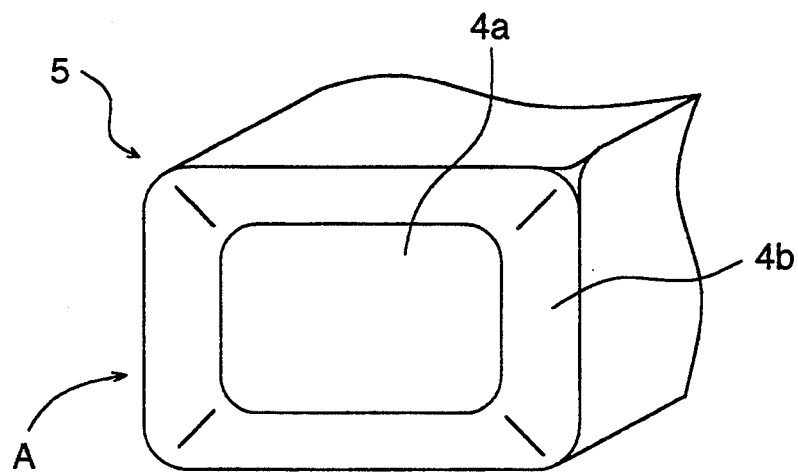
FIG. 2 is a perspective view of an optical member.
Figure 3:
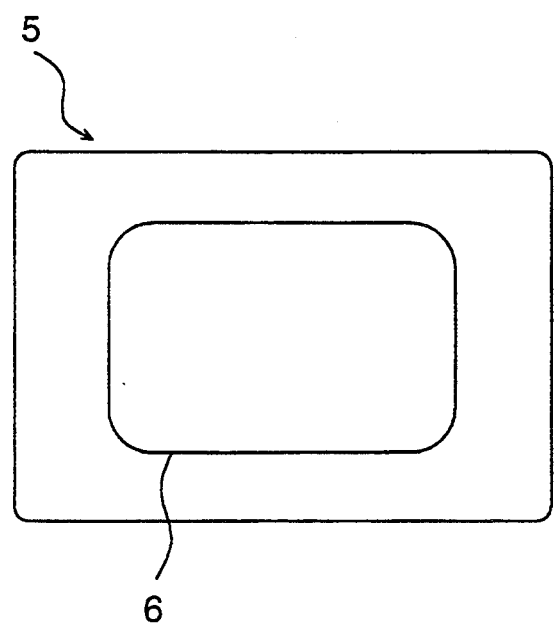
FIG. 3 is a view showing a display condition of a view field frame.

Referring to the drawings, an example of a display device in a viewfinder according to the present invention will be described as follows. Initially, the first example of the display device in a viewfinder shown in FIGS. 1, 2 and 3, will be described as follows. FIG. 1 is a schematic drawing showing the display device in a viewfinder, FIG. 2 is a perspective view of an optical member, and FIG. 3 is a view showing a condition of a display of a view field frame.

In the display device in the viewfinder, the first optical member 3 and the second optical member 4 which form a focusing surface of an object image by an objective lens 1 are located between the objective lens 1 and an eyepiece 2. The objective lens 1 comprises a concave lens 1a, a convex lens 1b, and concave lens 1c. In the vicinity of a position at which an image of an object is formed by the objective lens 1, the first optical member 3 and the second optical member 4 are arranged, and the first optical member 3 and the second optical member 4 are composed of prisms.

Accordingly, an object image formed by the objective lens 1 passes through the first optical member 3 and the second optical member 4, and is observed as an erect image through an eyepiece 2. An inclined surface 4b is formed at the periphery of the focusing surface 4a of the second optical member 4 to form the focusing surface, on which an object image is formed by the objective lens 1, of the real image type viewfinder 5, and a view field frame 6 is displayed in the viewfinder together with an object image of the real image. Therefore, the view field frame 6, together with the object image, can be observed in the viewfinder. Due to the foregoing, a display section A of the view field frame to display the view field frame 6 is provided in the viewfinder when the inclined surface portion 4b is formed in the direction in which the periphery of the image formation surface of the second optical member 4 is protruded with respect to the image formation surface.

That is, a ray of light "a" shown in the drawing is an example of an optical path, through which an original ray of light passes from the object to the eye of the photographer. The ray of light "b" is an example of the ray of light which comes to the inclined surface 4b provided in the vicinity of the image formation surface of the second optical member 4. After the ray of light "b" is refracted by the inclined surface, the ray of light "b" is refracted by a reflection surface of the second optical member 4 and goes out to the outside of the second optical member 4, or is irregularly reflected by the side surface of the second optical member 4 which has been mat-processed. Accordingly, because the ray of light "b" can scarcely reach eyes, the view field frame 6 is formed by the inclined surface portion 4b.

As described above, the view field frame 6 is displayed when the inclined surface portion 4b is formed at the periphery of the image formation surface, on which the object image is formed, of the optical member in the direction in which the periphery of the image formations surface is protruded with respect to the image formation surface, in the real image type viewfinder 5. Therefore, when the optical member is made by molding, surface processing can be easily conducted on the image formation surface portion of a mold because the surface of the inclined surface portion 4b can be lowered with respect to the image formation surface portion in the structure of the mold.

Figure 4:
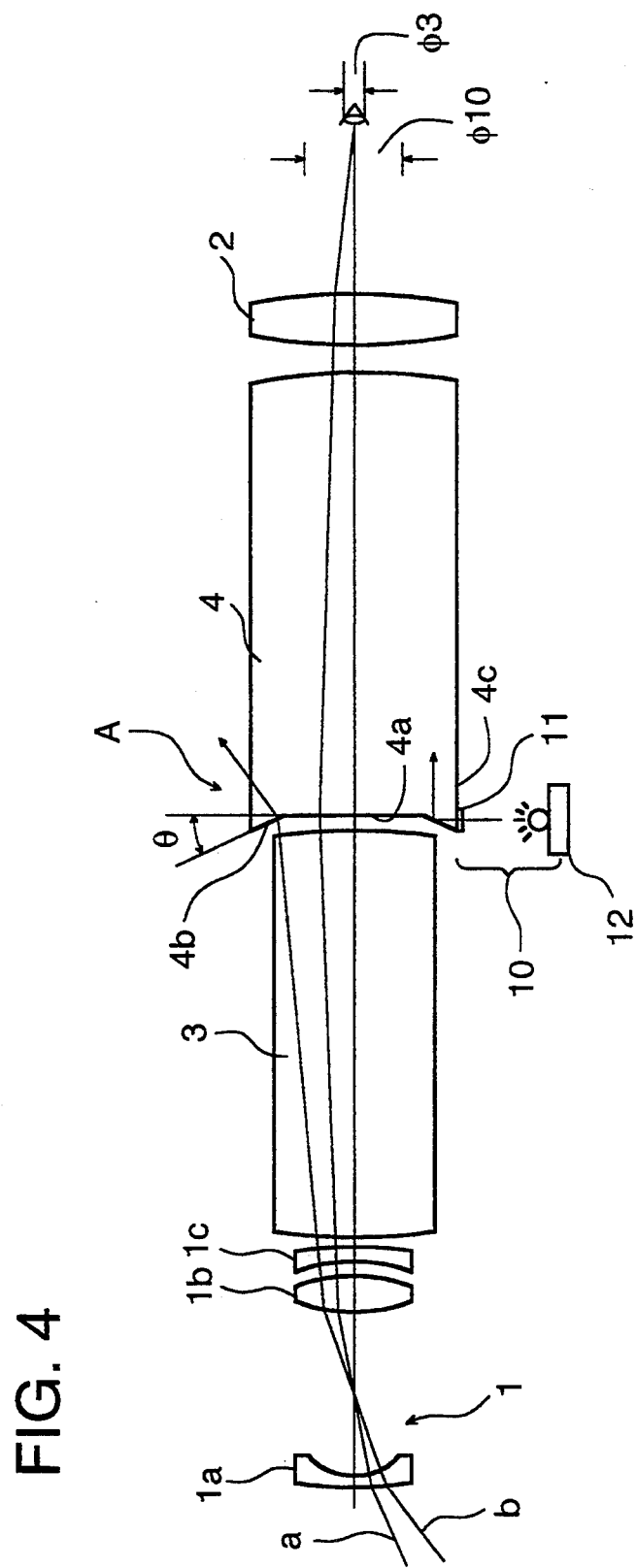
FIG. 4 is a schematic drawing showing a display device in the viewfinder.
Figure 5:
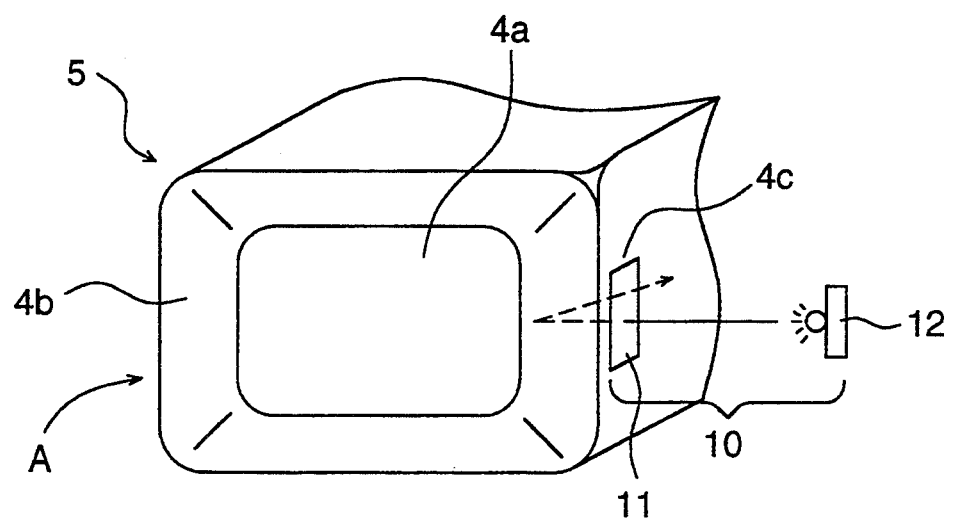
FIG. 5 is a perspective view of an optical member.

FIGS. 4 and 5 show the second example of the display device in the viewfinder. FIG. 4 is a schematic drawing of the display device in the viewfinder, and FIG. 5 is a perspective view of the optical member. The second example is structured in the same way as the first example shown in FIG. 1 to FIG. 3. In this second example, a photoelectric display unit 10 in the viewfinder is arranged on the side of the inclined surface portion 4b of the second optical member 4. That is, a display section 11 in the viewfinder is provided on a side portion 4c of the inclined surface portion 4b of the second optical member 4, and when the display section 11 in the viewfinder is irradiated by a light source 12, the photographic information is displayed on a portion of the inclined surface 4b of the second optical member 4 in the viewfinder. As described above, the display in the viewfinder is conducted when the photoelectric display unit 10 is provided on the side of the inclined surface 4b of the second optical member 4 and the display unit 10 is controlled. That is, the inclined surface 4b, which forms the view field frame 6 of the optical member is used, and a light for display sent from the photoelectric display unit 10 provided in the periphery of the inclined surface 4b, is refracted so that the photographic information can be displayed in the viewfinder, and therefore, the photographic information can be displayed without forming a complicated display section.

Figure 6:
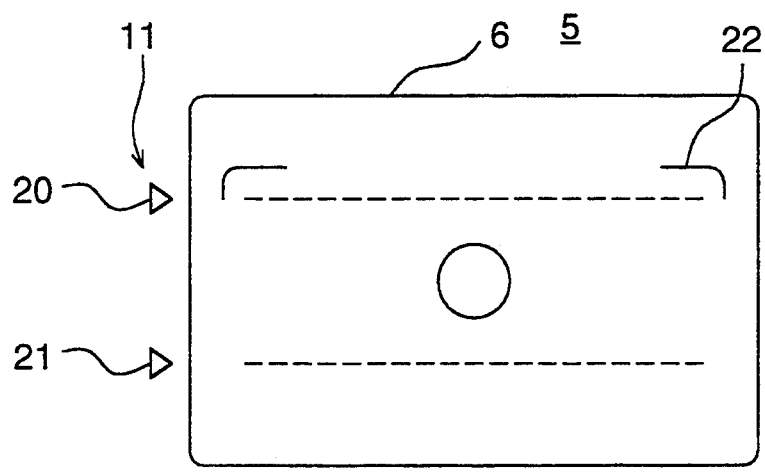
FIG. 6 is a view showing an example of display in the viewfinder.
Figure 7:
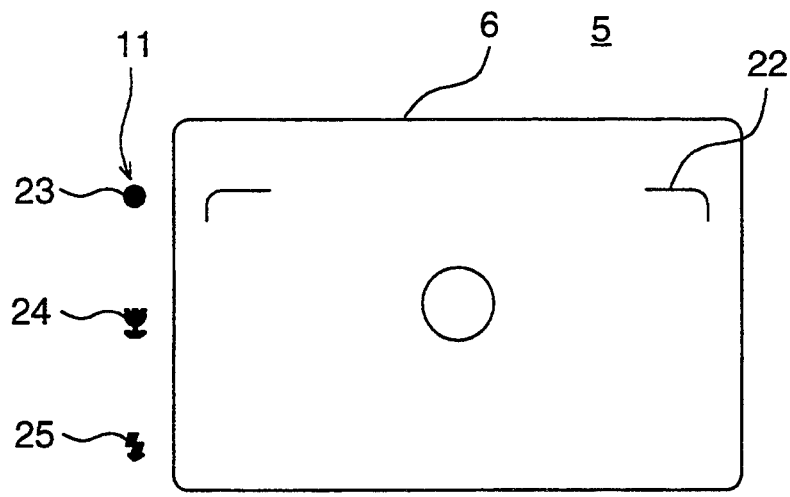
FIG. 7 is a view showing an example of the display in the viewfinder.

Examples of the display in the viewfinder are shown in FIGS. 6 and 7. In FIG. 6, display of frames 20, 21 for a panoramic shot is conducted by emission of LEDs, and correction marks 22 for short range photography are displayed in the viewfinder 5. In FIG. 7, display for automatic focusing (AF) 23, display for close-up photography 24, and display for strobe photography 25 are conducted by light emission of LEDs in the display section 11 in the viewfinder.

In the case where only display of photographic information is considered, it is not necessary that an inclined surface portion 4b is provided on every side of the focusing surface 4a, but it may be provided on one side. However, when the inclined surface portion 4b is provided on every side of the focusing surface 4a, much photographic information can be displayed, and therefore, it is of course that the highly visible view field frame 6 can be formed as described above.

Figure 8:
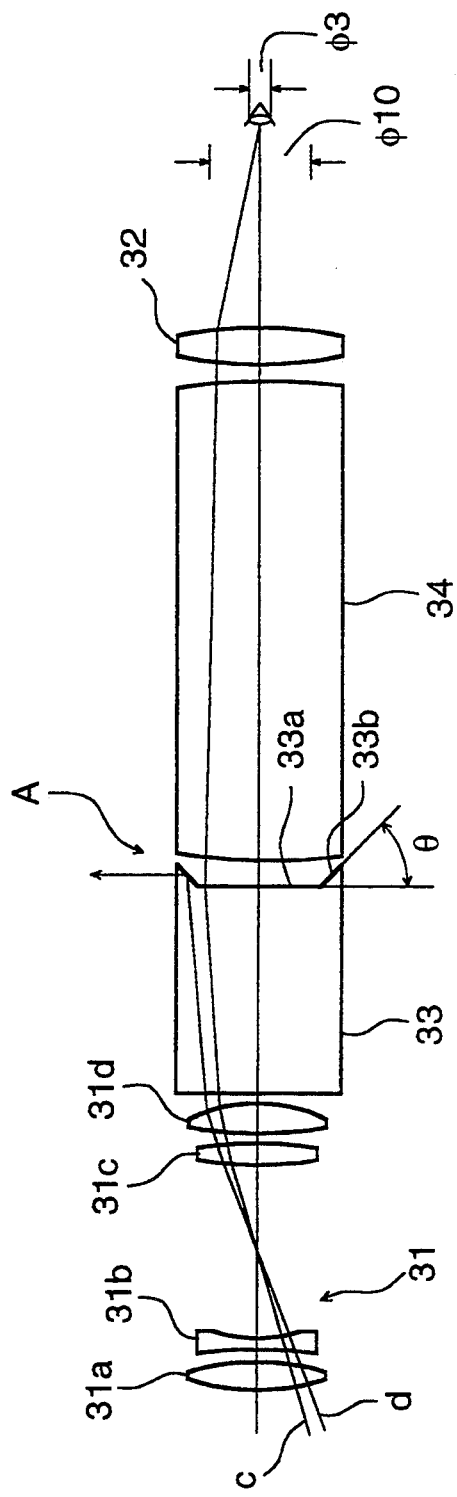
FIG. 8 is a schematic drawing showing a display device in the viewfinder.

FIG. 8 is a schematic drawing of the third example of the display device in the viewfinder. In the display device in the viewfinder, a first optical member 33 and a second optical member 34, in which the focusing surface of the object image is formed by an objective lens 31, are located between the objective lens 31 and an eyepiece 32. The objective lens 31 is composed of a convex lens 31a, a concave lens 31b, and convex lenses 31c and 31d. The first optical member 33 and the second optical member 34 are located in the vicinity of a position at which the object image is formed by the objective lens 31.

Accordingly, the object image formed by the objective lens 31 passes through the first optical member 33 and the second optical member 34, and is observed through the eyepiece 32 as an erect image. An inclined surface portion 33b is formed at the periphery of a focusing surface 33a of the first optical member 33 in which a focusing surface of the object image is formed by the objective lens 31, and the view field frame is displayed together with the real image of the object image, so that the view field frame can be observed at the same time as the object image.

That is, a ray of light "c" is an example of an optical path of the ray of original light sent from the object to the eyes. A ray of light "d" is an example of the ray of light sent to the inclined surface 33b which is provided in the vicinity of the image formation surface of the first optical member 33. Because the ray of light "d" is totally reflected by the inclined surface, and does not reach the eyes, the view field frame is formed with the inclined surface 33b.

Figure 9:
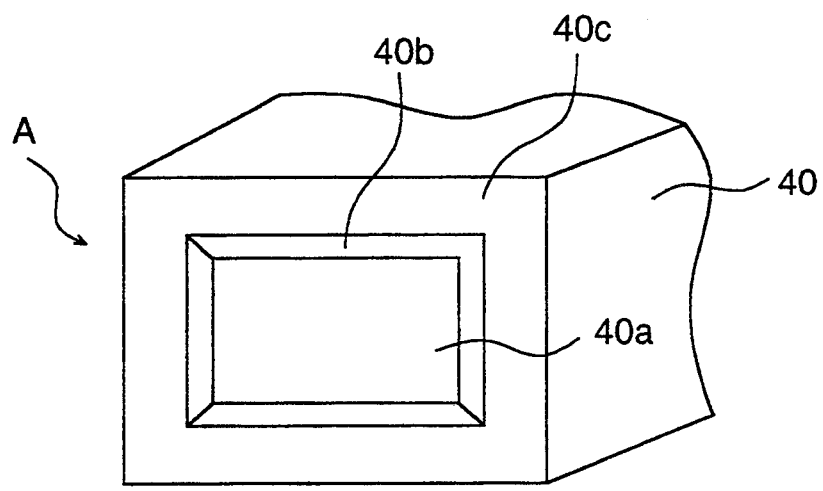
FIG. 9 is a perspective view of the optical member.
Figure 10:
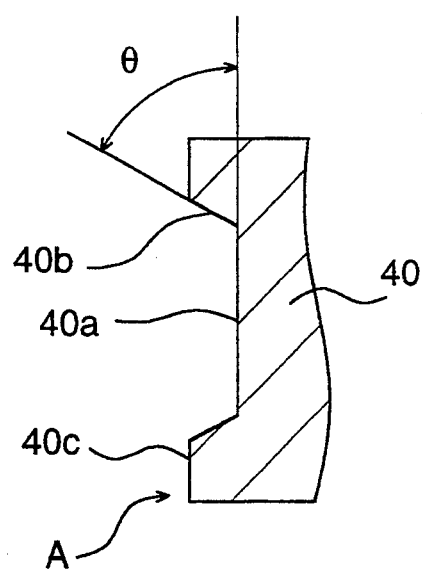
FIG. 10 is a sectional view of the optical member.

FIGS. 9 and 10 show the other example of the optical member. FIG. 9 is a perspective view of the optical member, and FIG. 10 is a sectional view of the optical member. In this optical member 40, an inclined surface 40b is formed between a focusing surface 40a and a surface 40c, which is parallel with the focusing surface 40a, at the periphery of the focusing surface 40a.

In the foregoing examples, when an angle $\theta$ of the inclined surface portion of the optical member is not more than 10°, the ray of light reaches within the range of an eye-point $\phi 3$, so that the view field frame looks white. When the angle $\theta$ of the inclined surface portion of the optical member is not less than 10° and smaller than 30°, the ray of light is not within the range of the eye-point $\phi 3$, and therefore, the view field frame normally looks black, but when the position of the eyes is shifted, it looks white, Further, when the angle $\theta$ of the inclined surface portion of the optical member is not less than 30° and smaller than 90°, the ray of light does not reach within the range of the eye-point $\phi 10$, and therefore, the view field frame looks black even when the position of the eyes is shifted. As described above, when the angle $\theta$ of the inclined surface portion of the optical member is not less than 10° and smaller than 30°, the view field frame looks black, which is preferable. Further, the view field frame looks black even when the eye position is shifted, when the angle $\theta$ of the inclined surface portion of the optical member is less than 30° and smaller than 90°, that is more preferable.

As described above, in the first embodiment, the view field frame is displayed when the inclined surface portion is formed at the periphery of the image formation surface, on which the object image is formed, of the optical member in the direction in which the periphery of the image formation surface is protruded with respect to the image formation surface, in the real image type viewfinder. Therefore, when the optical member is made by molding, surface processing can be easily conducted on the image formation surface portion of a mold because the surface of the inclined surface portion can be lowered with respect to the image formation surface portion in the structure of the mold.

In the second embodiment, the inclined surface portion can be clearly observed as a view field frame when the inclination angle of the inclined surface portion of the optical member is not less than 10° and smaller than 90°.

In the third embodiment, because photographic information can be displayed in the viewfinder when the light for display, which is sent from the photoelectric display unit provided at the periphery of the inclined surface portion by which the view field frame of the optical member is formed, is refracted using the inclined surface portion, the display can be conducted without forming a complicated display section.

What is claimed is:

1. A display device in a real image type viewfinder, comprising:
   (a) an objective lens;
   (b) an eyepiece;
   (c) an optical member provided between the objective lens and the eyepiece, the optical member having an image formation surface, wherein an object image is formed by the objective lens on the image formation surface; and
   (d) a display section for displaying a view field frame of the viewfinder, the display section being provided when an inclined surface portion is formed in a direction in which a peripheral portion of the image formation surface is protruded away from the image formation surface.

2. The display device of claim 1, wherein an inclination angle of the inclined surface portion is not less than 10° and smaller than 90°.

3. The display device of claim 1 further comprising:
   a photoelectric display unit provided on a side surface of the optical member in the inclined surface portion, for displaying photographic information, wherein display is conducted in the viewfinder when the display unit is controlled.

4. The display device of claim 1, wherein the inclined surface portion includes the entire peripheral portion of the image formation surface, for displaying photographic information.

* * * * *